(12) United States Patent
Rademacher et al.

(10) Patent No.: US 11,987,094 B2
(45) Date of Patent: May 21, 2024

(54) HEATER CORE AND METHOD FOR SERVICING A HEATER CORE

(71) Applicant: Valeo North America, Inc., Auburn Hills, MI (US)

(72) Inventors: Gregory Rademacher, Auburn Hills, MI (US); Jason Kreucher, Auburn Hills, MI (US); Heather Hartman, Auburn Hills, MI (US)

(73) Assignee: Valeo North America, Inc., Troy, MI (US)

( * ) Notice: Subject to any disclaimer, the term of this patent is extended or adjusted under 35 U.S.C. 154(b) by 78 days.

(21) Appl. No.: 17/366,935

(22) Filed: Jul. 2, 2021

(65) Prior Publication Data

US 2021/0331555 A1 Oct. 28, 2021

Related U.S. Application Data

(62) Division of application No. 16/444,542, filed on Jun. 18, 2019, now Pat. No. 11,124,045.

(51) Int. Cl.
*B60H 1/00* (2006.01)
*B23P 6/00* (2006.01)
*B60H 1/32* (2006.01)

(52) U.S. Cl.
CPC ............ *B60H 1/00585* (2013.01); *B23P 6/00* (2013.01); *B60H 1/00064* (2013.01); *B60H 1/00557* (2013.01); *B60H 1/3227* (2013.01); *B60H 2001/00078* (2013.01); *B60H 2001/00107* (2013.01); *B60H 2001/00114* (2013.01);

(Continued)

(58) Field of Classification Search
CPC ............ B60H 1/00585; B60H 1/00514; B60H 1/00521; B60H 2001/00078
See application file for complete search history.

(56) References Cited

U.S. PATENT DOCUMENTS 4,691,862 A * 9/1987 Muto ................. B60H 1/00035
237/12.3 A
5,414,905 A * 5/1995 Kimura ................... F16L 33/03
24/20 R (Continued)

FOREIGN PATENT DOCUMENTS

EP 3077231 B1 * 8/2017 ......... B60H 1/00521
JP H09263117 A 10/1997
KR 20180091409 A 8/2018

OTHER PUBLICATIONS

English Translation EP-3077231-B1 (Year: 2017).*
Office Action Issued in Corresponding CN Application No. 202080044823.8, dated Jan. 6, 2024. (9 Pages).

*Primary Examiner* — David J Teitelbaum
(74) *Attorney, Agent, or Firm* — Osha Bergman Watanabe & Burton LLP

(57) ABSTRACT

A method for servicing a heater core installed in a heating, ventilation, and air-conditioning (HVAC) assembly for a motor vehicle includes removing a sealing attachment from an interfacing connection interfacing with the heater core. The method includes sliding the heater core in a direction of insertion. The method includes disconnecting, from the heater core, the interfacing connection. The method includes removing the heater core in a direction of extraction, the direction of extraction being orthogonal to the direction of insertion.

8 Claims, 12 Drawing Sheets

(52) U.S. Cl.
CPC .. *B60H 2001/0035* (2013.01); *B60H 1/00514* (2013.01); *B60H 1/00521* (2013.01); *B60H 2001/00635* (2013.01)

(56) References Cited

U.S. PATENT DOCUMENTS

| | | | |
|---|---|---|---|
| 6,264,713 B1* | 7/2001 | Lewis, II | B01D 46/521 |
| | | | 55/502 |
| 9,770,547 B2 | 9/2017 | Li | |
| 2005/0077095 A1* | 4/2005 | Shigematsu | B60K 11/04 |
| | | | 180/68.4 |
| 2006/0237176 A1* | 10/2006 | Vincent | F28F 9/001 |
| | | | 165/178 |
| 2009/0133284 A1 | 5/2009 | Belgard | |
| 2017/0151854 A1 | 6/2017 | Smith et al. | |
| 2020/0230540 A1* | 7/2020 | Schumacher | B60H 3/0616 |

\* cited by examiner

HEATER CORE AND METHOD FOR SERVICING A HEATER CORE

BACKGROUND

In the automotive field, heating, ventilation and/or air conditioning (HVAC) systems regulate the aerothermal parameters of the air circulated inside the passenger compartment. A heater core is a radiator-like device used in heating the cabin of a motor vehicle. Hot coolant from the motor vehicle's engine is passed through a winding tube of the heater core, a heat exchanger between coolant, and cabin air. Fins attached to the heater core tubes serve to increase surface for heat transfer to air that is forced past them, by a fan, thereby heating the cabin of a motor vehicle.

SUMMARY

In general, in one aspect, embodiments disclosed herein relate to a method for servicing a heater core installed in a heating, ventilation, and air-conditioning (HVAC) assembly for a motor vehicle. The method includes removing a sealing attachment from an interfacing connection interfacing with the heater core. The method includes sliding the heater core in a direction of insertion. The method includes disconnecting, from the heater core, the interfacing pipes. The method includes removing the heater core in a direction of extraction. The direction of extraction being orthogonal to the direction of insertion.

In general, in one aspect, embodiments disclosed herein relate to a heating, ventilation, and air-conditioning (HVAC) assembly for a motor vehicle. The HVAC assembly includes a heater core. The HVAC assembly includes a casing with walls defining an internal volume of the HVAC. The heater core is configured to slide inward in the internal volume toward the opposite side of the casing, in a direction of insertion. The HVAC assembly is configured for servicing the heater core by removing the heater core from the HVAC assembly in a direction of extraction. The direction of extraction is orthogonal to the direction of insertion.

In general, in one aspect, embodiments disclosed herein relate to a heating, ventilation, and air-conditioning (HVAC) system for a motor vehicle. The HVAC system includes a heater core. The HVAC system includes at least two pipe sleeves interfacing with the heater core, the at least two pipe sleeves transport fluids to, or from, the heater core. The HVAC system includes at least two sealing attachments that seal at least two sealing points of the HVAC system. The heater core is configured to slide inward in the internal volume toward the opposite side of the casing, in a direction of insertion. The HVAC system is configured for servicing the heater core by removing the heater core from the HVAC assembly in a direction of extraction. The direction of extraction is orthogonal to the direction of insertion.

A heater core may be serviceable with minimal HVAC module or instrument panel disassembly. The heater core may also be serviceable from a cabin side of a motor vehicle. The heater core may also be serviceable in a vertical direction while the heater core may be inserted into a distribution sub-assembly in a horizontal direction. To remove the heater core, the heater core may not need to be pulled out of the distribution sub-assembly horizontally, which may require a horizontal space equivalent to a length of the heater core.

In one or more embodiments, the heater core may be configured for servicing allowing the HVAC module to be assembled in a side to side configuration (horizontal) while still allowing the heater core to be serviced in a vertical manner avoiding a limited horizontal vehicle clearance. To this point, the heater core may be configured to move cross a motor vehicle within a module when a supporting cover is removed. A locking rib attached to the supporting cover may keep the core in position during normal use. As such, when the supporting cover is removed the heater core may be pushed across the motor vehicle, compressing a thick piece of elastic material that prevents air bypass of the heater core. In one or more embodiments, once the heater core is moved inward, tubes attached to the heater core may rotate out of tank sleeves attached to the heater core, giving the heater core clearance to slide vertically out of the module. Installation may be performed reverting the process.

Other aspects of the disclosure will be apparent from the following description and the appended claims.

DETAILED DESCRIPTION

Figure 1:
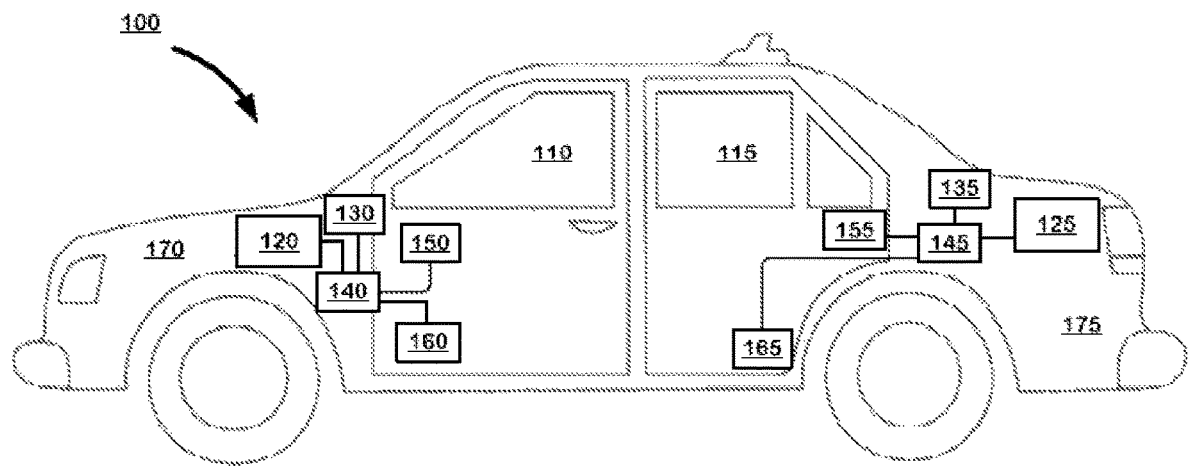
FIG. 1 shows a block diagram of an automotive system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include methods, assemblies, and systems directed to servicing a heater core installed in an HVAC system. A heater core may be used in HVAC vehicle applications, such as for example, in heavy motor vehicles that may depend on programed HVAC systems to adapt a cabin temperature. In these applications, a smaller footprint may be achieved by installing a heater core in an HVAC assembly, or sub-assemblies, during a manufacturing process or assembling process of the HVAC assembly. The heater core may be configured for servicing without removing any other part of the HVAC assembly assembled during the manufacturing process. In one or more embodiments, the heater core may be installed in the HVAC system in a first direction and the heater core may be serviced in a second direction.

FIG. 1 shows a block diagram of a system in accordance with one or more embodiments. FIG. 1 shows a heating, ventilation, and air-conditioning (HVAC) system (100) for a motor vehicle according to one or more embodiments, having various equipment that is powered during regular operation of the motor vehicle. The HVAC system (100) may be a split HVAC system configured to connect two HVAC subassemblies for the HVAC system (100) to operate. The HVAC system (100) may be a single system installed at the front or at the back of a motor vehicle. Additionally, the HVAC system (100) may be one system divided between two parts, one located at the front and another one located at the back of the motor vehicle. In one or more embodiments, a system, or sub-system, located at the front of the vehicle may include the same elements mirrored in the back of the vehicle. In one or more embodiments, the motor vehicle may be divided into two areas: an area outside passenger compartments (170, 175) and an area inside passenger compartments (110, 115). Furthermore, the system may include a distribution controller (120, 125), an airflow space (130, 135), a motor blower (140, 145), an evaporator (150, 155), and a heater core (160, 165). Those skilled in the art will appreciate that the configuration of FIG. 1 is not limited to that which is shown, and that one or more of the above-mentioned components may be combined or omitted.

The area outside passenger compartments (170, 175) may be any area that a passenger does not have access to through regular use of the motor vehicle. As such, these areas may include under and above the motor vehicle, under the hood at the front of the motor vehicle, or in the trunk at the back of the motor vehicle. This area may be larger in larger vehicles or vehicles that do not require a conventional engine, such as is the case with electric motor vehicles. In a hatchback vehicle, or a vehicle with the back or front exposed to the driver, this area may be considered as any area beyond the dashboard at the front or any area behind the back seats at the back.

The area inside passenger compartments (110, 115) may be any area that any passenger has access to at any point through regular use of the motor vehicle. For example, this area may include any area from the dashboard towards the direction of the driver and any area from the back seats towards the front of the car.

The system may include a motor blower (140, 145) hardware configured to produce regulated burst of rotational force to activate subsequent motors or directly impact flow of air in the airflow chamber and the airflow space (130, 135). For example, the motor blower (140, 145) may be considered a device for enabling a fan to push hot/cold air in/out of the area inside passenger compartments (110, 115).

The airflow space (130, 135) may be hardware configured for transporting airflow inside/outside the motor vehicle. In the HVAC system (100), these components may circulate air in/out of the motor vehicle while avoiding impacting shifting in weights. For example, the airflow space (130, 135) may be coupled to the evaporator (150, 155) and the heater core (160, 165) for moving an airflow through the motor vehicle.

The evaporator (150, 155) and the heater core (160, 165) may be one or more elements of an electric radiator that exchanges heat with at least one fluid to change a temperature level in the distributed airflow.

The distribution controller (120, 125) may be a processor or a human-machine interface through which the motor blower (140, 145) is controlled. The distribution controller (120, 125) may be a processor coupled with motors connected to vents for distributing airflow in the motor vehicle. Further, the distribution controller (120, 125) may control and regulate the use of the evaporator (150, 155) and the heater core (160, 165).

The HVAC system (100) may be assembled in at least two distinct sub-assemblies. As such, the above-referenced elements of the HVAC system (100) may be distributed in one or both of the sub-assemblies. For example, in one or more embodiments, the evaporator (150, 155) and the motor blower (140, 1145) may be part of a first sub-assembly of the HVAC system (100), located outside of the passenger compartment of the motor vehicle, while the heater core (160, 165) and the distribution controller (120, 125) may be part of a second sub-assembly of the HVAC system, located inside the passenger compartment of the motor vehicle. Those skilled in the art will appreciate that embodiments disclosed herein are not limited to the aforementioned example of distribution of elements across sub-assemblies and that these elements may be located in either sub-assembly without departing from embodiments disclosed herein. The sub-assemblies and their respective assembling process are described in more detail in FIGS. 3-11 below.

The area outside of the passenger compartment and the area inside the passenger compartment may be split by a wall (not shown). The wall may be, in one or more embodiments, a metal sheet associated with the dashboard (not shown in FIG. 1) of the motor vehicle.

Figure 2:
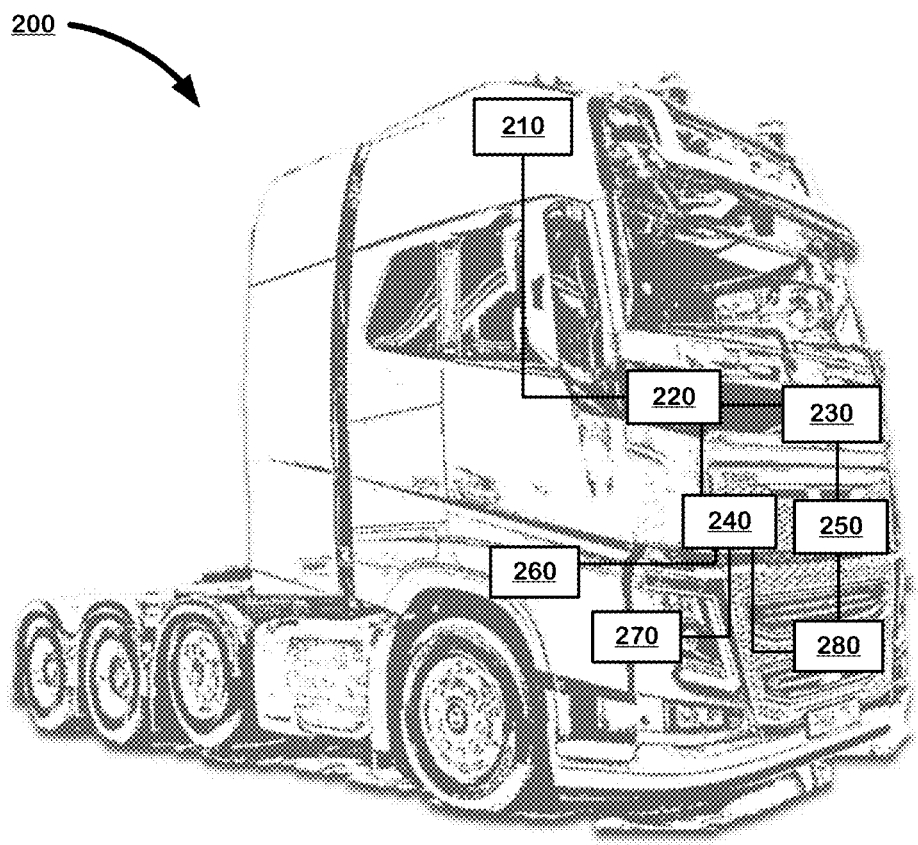
FIG. 2 shows a block diagram of an automotive system in accordance with one or more embodiments.

Turning to FIG. 2, FIG. 2 shows a block diagram of an automotive system in accordance with one or more embodiments. FIG. 2 shows an extended HVAC system (200) for a heavy motor vehicle according to one or more embodiments having various equipment that is powered during regular operation of the heavy motor vehicle. The extended HVAC system (200) may be one system divided between two parts, one located at the front and another one located at the back of the heavy motor vehicle, or one located at the top and another one located at the bottom of the heavy motor vehicle. In one or more embodiments, a system, or sub-system, located at the front of the vehicle may include the same elements mirrored in the back of the heavy motor vehicle. In one or more embodiments, the heavy motor vehicle may be a truck and may include one or more sensing elements (210, 230, 250), a distribution controller (220), a motor blower (240), an evaporator (260), a heater core (270), and an airflow space (280).

The system may include one or more sensing elements (210, 230, 250), which may be hardware configured to evaluate surrounding areas inside/outside the heavy motor vehicle and provide feedback relating to physical phenomena. In one or more embodiments, the one or more sensing elements (210, 230, 250) may be a first sensing element (210), a second sensing element (230), and a third sensing element (250). The one or more sensing elements (210, 230, 250) may operate individually or in cooperation with one another to provide a distribution controller (220) with information relating to the physical phenomena. The one or more sensing elements (210, 230, 250) may be hardware sensors for sensing/measuring the vehicle environment, such as object detection sensors, temperature sensors, distance sensors, etc. For example, the one or more sensing elements (210, 230, 250) may aid in a self-driving operation of the heavy motor vehicle. In one or more embodiments, the one or more sensing elements (210, 230, 250) may provide a driver with visual/audio signals relating to the surrounding areas of the heavy motor vehicle. Furthermore, the one or more sensing elements (210, 230, 250) may be part of an autonomous operating system that determines various temperature values for the inside of the cabin in the heavy motor vehicle.

The distribution controller (220) may be a processor or a human-machine interface through which the motor blower (240) and the one or more sensing elements (210, 230, 250) are controlled. The distribution controller (220) may be a processor coupled with motors connected to vents for distributing airflow in the heavy motor vehicle. Further, the distribution controller (220) may control and regulate the use of the evaporator (260) and the heater core (270).

The motor blower (240) may be hardware configured to produce regulated burst of rotational force to activate subsequent motors or directly impact flow of air in the airflow chamber and the airflow space (280). For example, the motor blower (240) may be considered a device for enabling a fan to push hot/cold air in/out of the area inside a passenger compartment.

The evaporator (260) and the heater core (270) may be one or more elements of an electric radiator that exchanges heat with at least one fluid to change a temperature level in the distributed airflow. In one or more embodiments, the evaporator (260) and the heater core (270) may be assembled during a manufacturing process and the evaporator (260) and the heater core (270) may be afterwards installed within the heavy motor vehicle as part of the extended HVAC system (200). In one or more embodiments, the evaporator (260) and/or the heater core (270) may be serviced through the passenger compartment and without uninstalling any other parts of the extended HVAC system (200).

The airflow space (280) may be hardware configured for transporting airflow inside/outside the heavy motor vehicle. In the extended HVAC system (200), this component may circulate air in/out of the motor vehicle while avoiding impacting shifting in weights. For example, the airflow space (280) may be coupled to the evaporator (260) and the heater core (270) for moving an airflow through the motor vehicle.

The extended HVAC system (200) may be assembled in at least two distinct sub-assemblies. As such, the above-referenced elements of the extended HVAC system (200) may be distributed in one or both of the sub-assemblies. For example, in one or more embodiments, the evaporator (260) and the motor blower (240) may be part of a first sub-assembly of the extended HVAC system (200), located outside of the passenger compartment of the motor vehicle, while the heater core (270) and the distribution controller (220) may be part of a second sub-assembly of the HVAC system, located inside the passenger compartment of the motor vehicle. Those skilled in the art will appreciate that embodiments disclosed herein are not limited to the aforementioned example of distribution of elements across sub-assemblies and that these elements may be located in either sub-assembly without departing from embodiments disclosed herein. The sub-assemblies and their respective assembling process are described in more detail in FIGS. 3-11 below.

Figure 3:
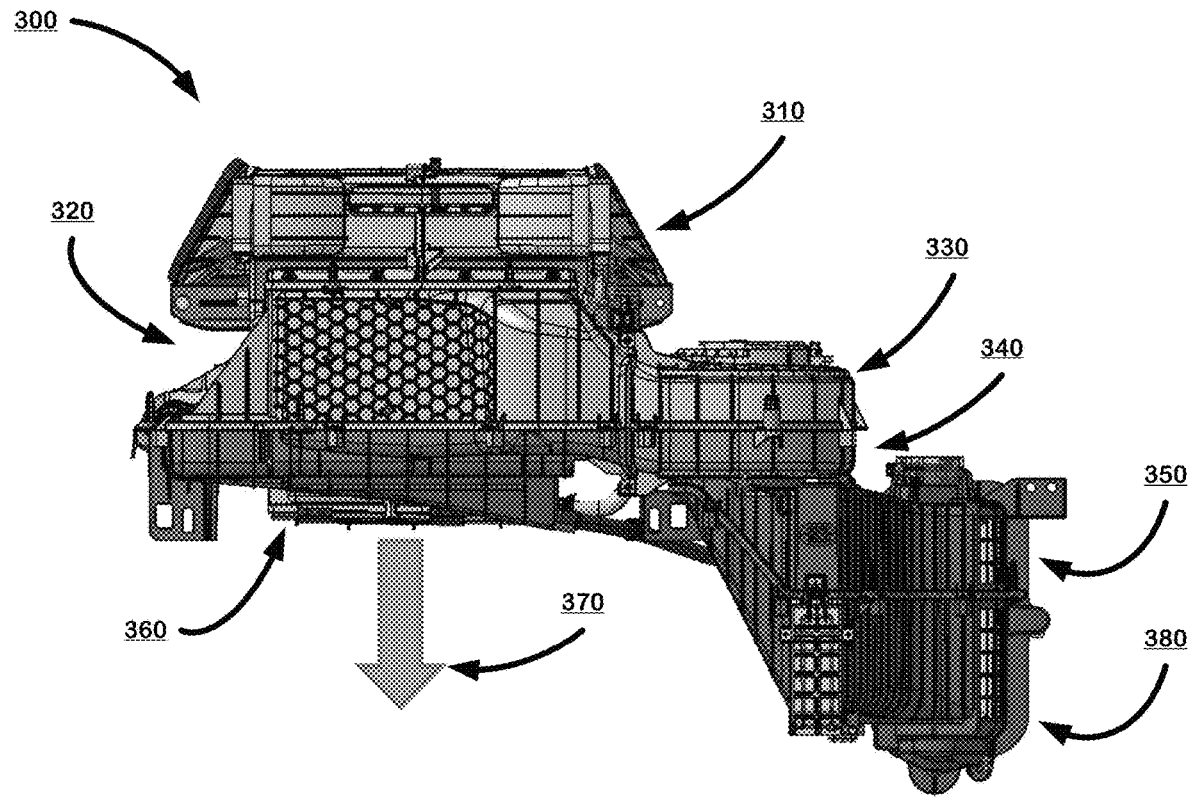
FIG. 3 shows an example of a heater core installed in an HVAC assembly in accordance with one or more embodiments.

Turning to FIG. 3, FIG. 3 shows a front view of an HVAC assembly in accordance with one or more embodiments. As shown in FIG. 3, the HVAC assembly (300) may be a combination of at least two sub-assemblies assembled in a direction of insertion within a motor vehicle. The HVAC assembly (300) may include an air distribution outlet (310) that may be coupled to an evaporator (320) and a heater core (360) in one direction. The HVAC assembly (300) may include a motor blower (330) in a blower assembly (340) that may be coupled to an air distribution inlet (350) in an air inlet assembly (380).

It may not be needed to dismantle or uninstall the HVAC assembly (300) once it has been installed through a manufacturing process or an assembling process. As such, the heater core (360) may be permitted to be serviced in only one direction after the HVAC assembly (300) has been installed. In one or more embodiments, this direction of heater core servicing may be a direction of extraction (370) which may provide the heater core (360) with sufficient space to be removed from the HVAC assembly (300) without having to dismantle, or remove, other parts of the HVAC assembly (300) unnecessarily. Necessary parts may be parts of the HVAC assembly (300) or sub-assemblies that may directly hold the heater core (360) installed inside the HVAC assembly (300). Parts that are unnecessary to be removed for heater core servicing may be parts of the HVAC assembly (300) or sub-assemblies that may not directly hold the heater core (360) installed inside the HVAC assembly (300). As such, unnecessary parts may include any of the elements or sub-assemblies discussed herein as long as these components are not in contact with the heater core (360). For example, in one or more embodiments, only latches, locking mechanisms, or clamps keeping the heater core (360) in the HVAC assembly (300) may be removed when servicing the heater core (360). Other subassemblies, such as the evaporator subassembly, the air inlet subassembly, etc., may remain intact as part of the HVAC assembly even while servicing the heater core.

In one or more embodiments, the direction of extraction (370) may be a direction towards a cabin or a passenger compartment, also known as a "Z" direction. The direction of extraction may be orthogonal, or perpendicular, to a direction of insertion of the heater core (360) into the HVAC assembly (300). For example, during a manufacturing/assembling process, the HVAC assembly (300) may include assembling the heater core (360) in a direction of insertion along the Y-axis at a manufacturing/assembling location (as seen from the front view in FIG. 3). In this example, the heater core may include tube connections outside of an HVAC housing, which may be disconnected for servicing allowing the heater core (360) to move back and forth in the direction of insertion. At this point, the heater core (360) may be further configured for allowing movement along the direction of insertion for removing of the heater core (360) in the direction of extraction (370), along the Z-axis.

Figure 4:
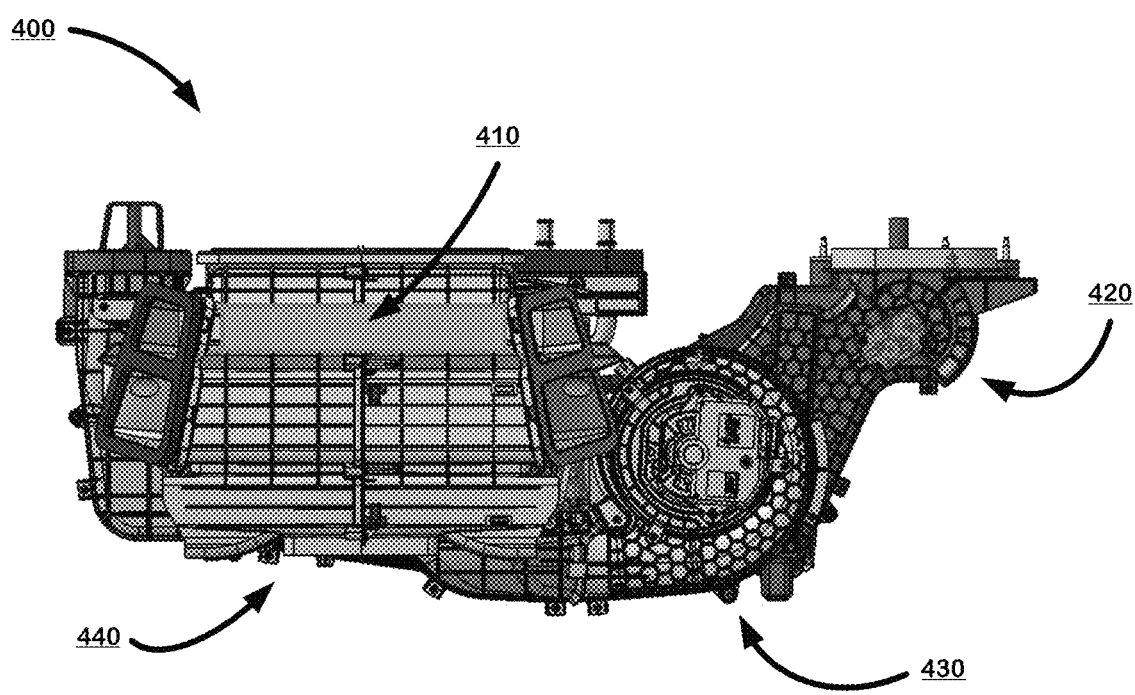
FIG. 4 shows an example of a heater core installed in an HVAC assembly in accordance with one or more embodiments.

Turning to FIG. 4, FIG. 4 shows a plan view of an assembly in accordance with one or more embodiments. As shown in FIG. 4, an HVAC assembly (400) may include three distinct sub-assemblies. These assemblies may include an air inlet sub-assembly (420), a motor blower sub-assembly (430) and an evaporator housing sub-assembly (440). A heater core may be embedded or installed within one or more of these sub-assemblies at a heater core location (410). As such, when servicing the heater core, the heater core may be configured for removal and servicing in a specific direction.

In one or more embodiments, the heater core location (410) including the heater core cannot be reached in a direction of insertion along a Y-axis. Similarly, in one or more embodiments, the heater core location (410) including the heater core cannot be serviced in a direction along an X-axis. As such, the heater core may be removed and serviced in a direction of extraction along a Z-axis.

In one or more embodiments, areas immediately adjacent to the heater core location (410) are blocked off by parts of the HVAC assembly (400) that cannot be removed, because removing these parts would require extraneous work from a mechanic or servicing agent. In one or more embodiments, the mechanic or servicing agent services the heater core by removing the heater core from the heater core location (410) without dismantling or uninstalling any other parts of the HVAC assembly (400).

Figure 5:
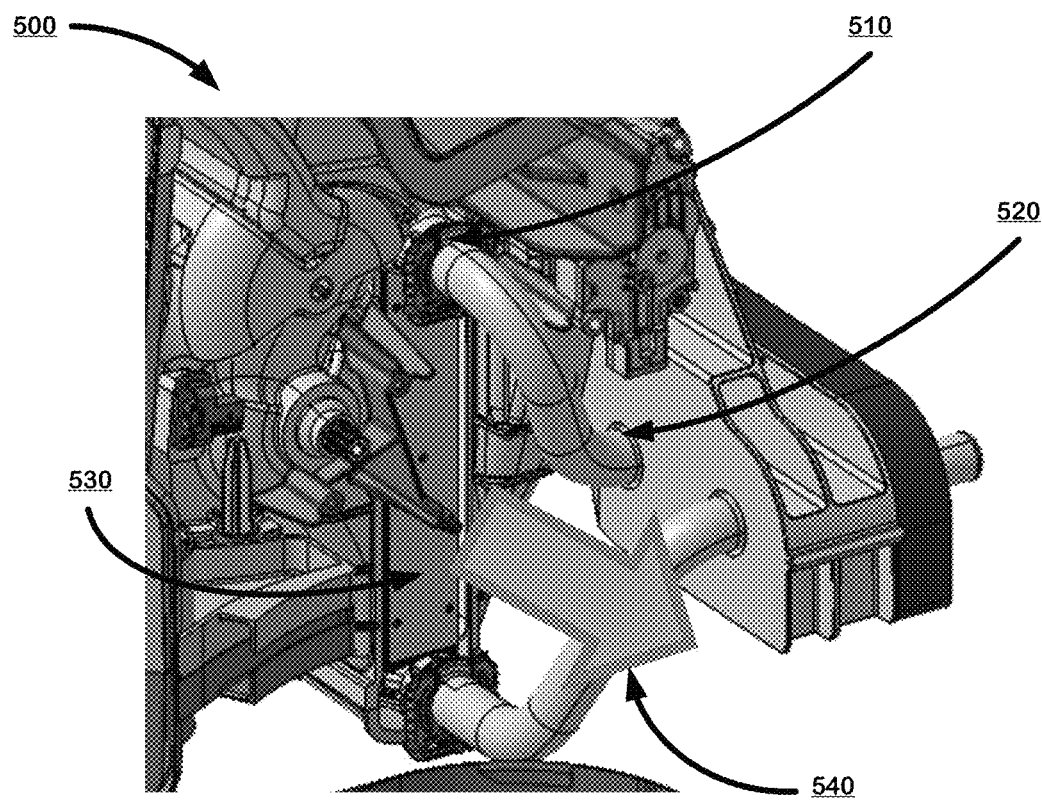
FIG. 5 shows an example of a heater core installed in an HVAC assembly in accordance with one or more embodiments.

Turning to FIG. 5, FIG. 5 shows a close-up view of an assembly in accordance with one or more embodiments. As shown in FIG. 4, an area (500) surrounding the heater core (530) may be blocked off. In one or more embodiments, the blocked off area is in a direction parallel to a direction of insertion (540). The direction parallel to the direction of insertion (540) may be blocked off by at least one tube (520) attached to the heater core (530) through at least one tank sleeve (510). As such, the heater core (530) may be locked in place within the HVAC assembly by an anchoring at a sealing point created between the at least one tube (520) and the at least one tank sleeve (510) being connected to the heater core (530).

In one or more embodiments, the area (500) is shown as being permanently blocked off in the direction parallel to the direction of insertion (540) at least because the at least one tube (520) cannot be disconnected from the tank sleeve (510) without dismantling larger portions of other sub-assemblies of the HVAC assembly. For example, considering FIG. 5 as a close-up view of the HVAC assembly in FIG. 4, FIG. 5 shows that the area (500) is blocked off and prevents servicing of the heater core in a direction along the Z-axis.

Figure 6:
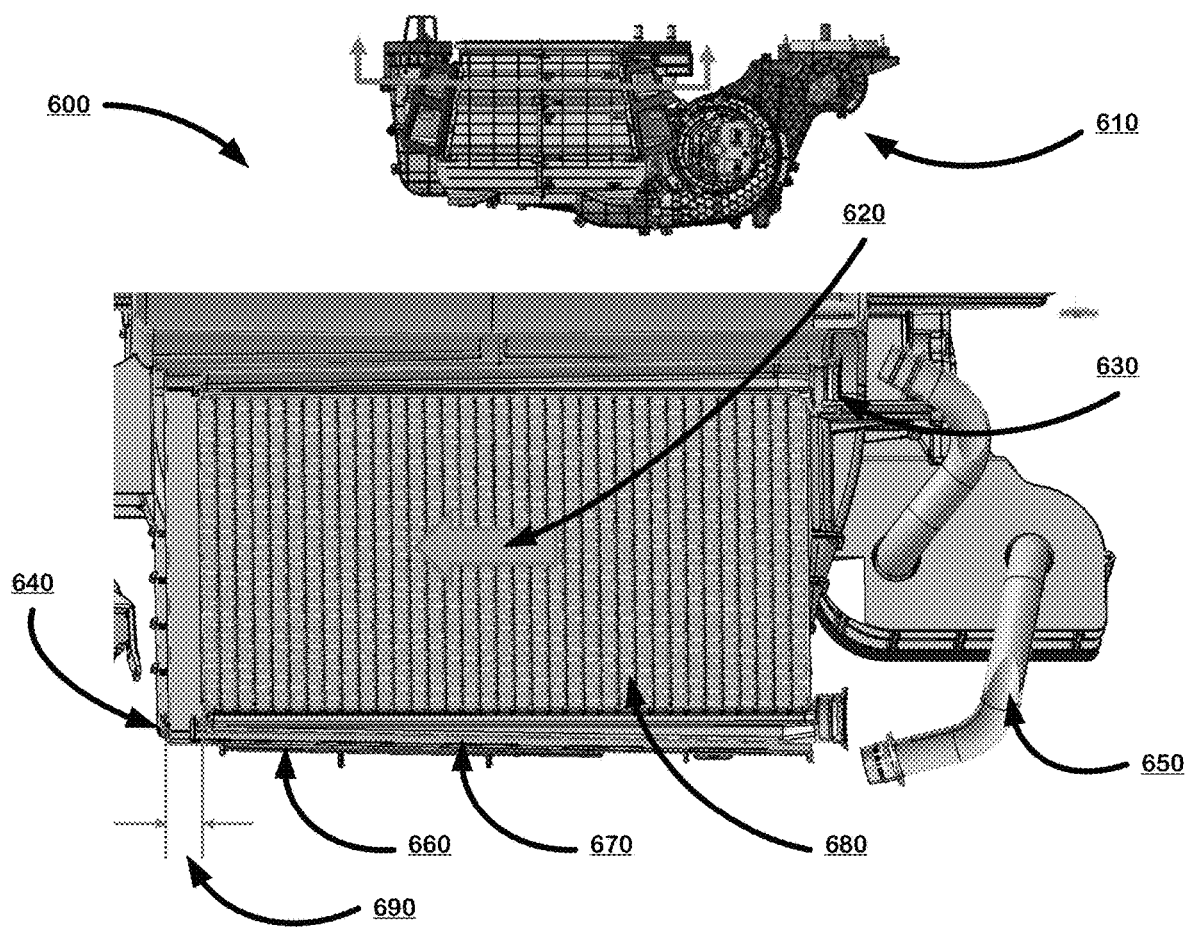
FIG. 6 shows an example of a heater core servicing configuration in accordance with one or more embodiments.

Turning to FIG. 6, FIG. 6 provides an example of a heater core servicing configuration. The following example is for explanatory purposes and not intended to limit the scope of the disclosed technology. Turning to FIG. 6, the cross-section (600) of the plan view of an HVAC assembly (610) is shown. The cross-section (600) includes an arrow pointing in the direction of insertion (620), at least one tank sleeve (630), at least one tube (650), and a rib (640) including a gap (690) and adjacent to the heater core (680). The rib may be disposed on a supporting cover (670) and a locking element (660).

In one or more embodiments, the at least one tube (650) is attached to the heater core (680) through the at least one tank sleeve (630) preventing the heater core (680) from traveling in a direction parallel to a direction of insertion along the Y-axis and towards the at least one tube (650). As such, the heater core (680) may be configured for servicing in a direction of extraction along a Z-axis, i.e., orthogonal to the direction of insertion (620).

In one or more embodiments, the heater core (680) is held in place in a direction parallel to the direction of extraction by a rib (640). In one or more embodiments, the rib (640) on the supporting cover (670) controls installation of the heater core (680) in the direction of insertion (620) during the manufacturing assembling process of the HVAC assembly. As such, the rib (640) may ensure that the heater core (680) is placed at a nominal position during installation. In one or more embodiments, the rib (640) facilitates a gap (690) at the base of the heater core. The gap (690) may be a transversal gap of a length at least equal to a height of the heater core (680). In one or more embodiments, the gap (690) may be filled with an elastic material that is compressed when the heater core is pushed against the material. For example, for servicing the heater core (680), the gap (690) may be filled with an elastic insulator or a foam material that may be compressed when sliding the heater core (680) inward, along the direction of insertion (620), into the gap (690) region. In one or more embodiments the gap (690) may include up to 20 millimeters of insulating material in length and may be up to 25 millimeters in thickness. As such, the space provided for the gap (690) is sufficient to disconnect from the interfacing connection of the at least one tube (650). Additionally, foam may be distributed all around the heater core (680) in all the narrow sides except for the side including the tank sleeves (630). The gap (690) allows ease of compression but does not allow for air bypass into the heater core.

In one or more embodiments, the gap (690) on the rib (640) at the base of the heater core (680) allows the heater core (680) to be pushed in the direction of insertion (620) along the Y-axis, which allows the at least one tube (650) to become disengaged from the tank sleeve (630) joining the at least one tube (650) to the heater core (680).

In one or more embodiments, the supporting cover (670) includes a locking element (660) that attaches the supporting cover (670) to the heater core (680). The locking element (660) may be hardware configured to lock the supporting cover (670) in contact with a side of the heater core (680). The locking element (660) may prevent movement from the heater core (680) in the direction of insertion (620) when the locking element (660) is in a locked position. As such, unlocking the locking element (660) and removing the supporting cover (670) with the rib (640) allows the heater core (680) to be movable in the direction of insertion (620). For example, the locking element (660) may be a sliding component that applies a pressure force among the heater core (680) and the supporting cover (670) by sliding along a direction parallel to the direction of insertion (620). To this point, the locking element (660) may release the pressure force among the heater core (680) and the supporting cover (670) by sliding in the direction of insertion (620), thereby allowing the supporting cover (670) to be removed without the locking element (680) ever being in contact with the heater core (680).

Figure 7:
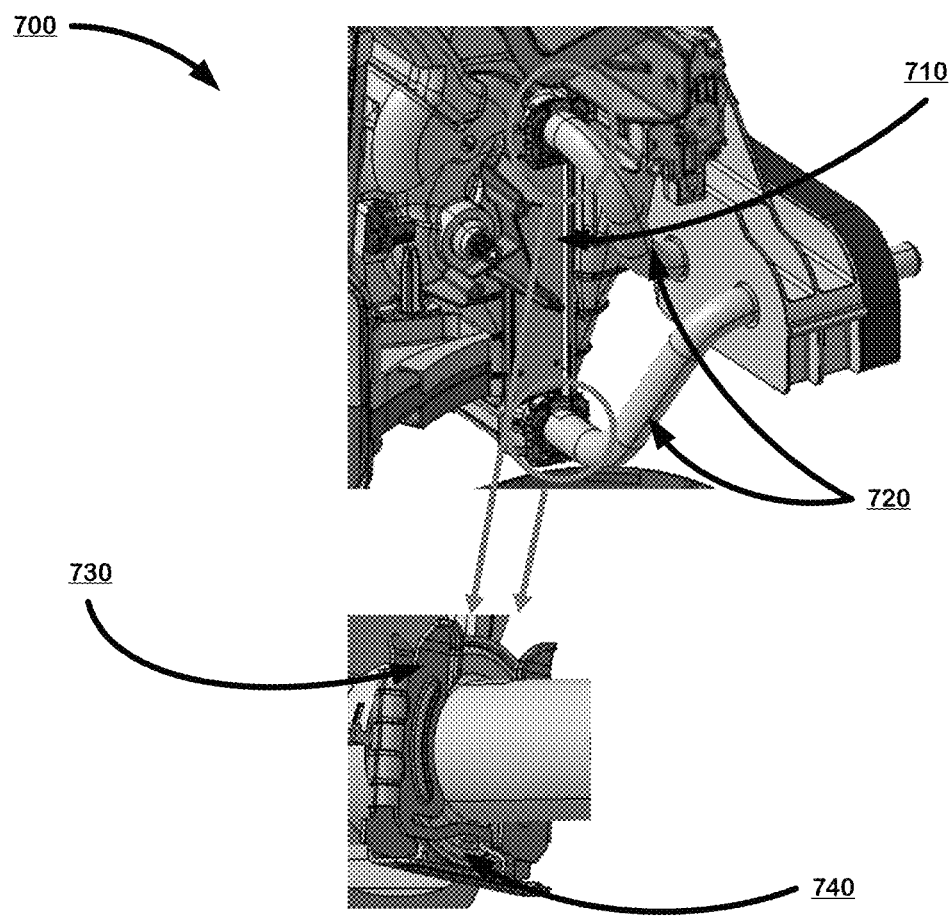
FIG. 7 shows an example of a heater core servicing configuration in accordance with one or more embodiments.

Turning to FIG. 7, FIG. 7 provides an example of a heater core servicing configuration. The following example is for explanatory purposes and not intended to limit the scope of the disclosed technology. Turning to FIG. 7, the area (500) of FIG. 5 may include at least one sealing attachment (740) assembled at a sealing point located at the connection of at least one tube (720) and at least one tank sleeve of a heater core (710). In one or more embodiments, the at least one sealing attachment (740) includes at least one tab (730) configured to be pulled for de-clamping from the at least one tube (720). In one or more embodiments, the at least one sealing attachment (740) may be a spring-clamp which may require pulling up on a tab to unlock the position of the at least one tube (720) and may require pulling the clamp to liberate the at least one tube (720) from the at least one tank sleeve. In one or more embodiments, there are at least two places in the sealing attachment (740) that include pulling in the manner discussed herein.

Figure 8:
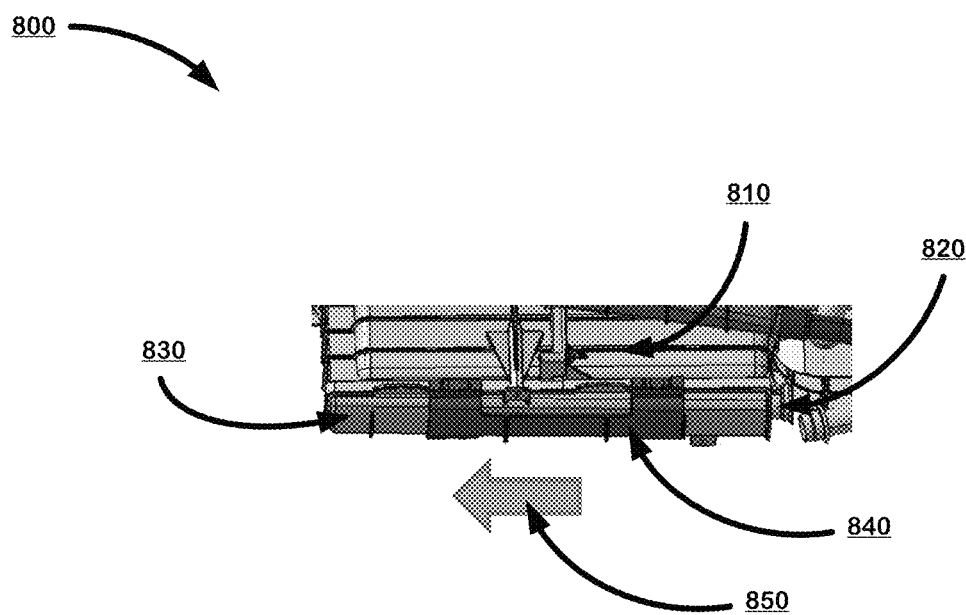
FIG. 8 shows an example of a heater core servicing configuration in accordance with one or more embodiments.

Turning to FIG. 8, FIG. 8 provides a close-up of an example of a heater core servicing configuration. The following example is for explanatory purposes and not intended to limit the scope of the disclosed technology. Turning to FIG. 8, a servicing area (800) may include the supporting cover (830) in contact with the heater core (810) including at least one tank sleeve (820) as attached by the locking element (840). The locking element (840) may remain locked until it unlocks by sliding to release the supporting cover (840) from holding the heater core (810) in the nominal position. The locking element (840) may slide in a direction parallel to the direction of insertion (850) and orthogonal to a direction of extraction.

Figure 9:
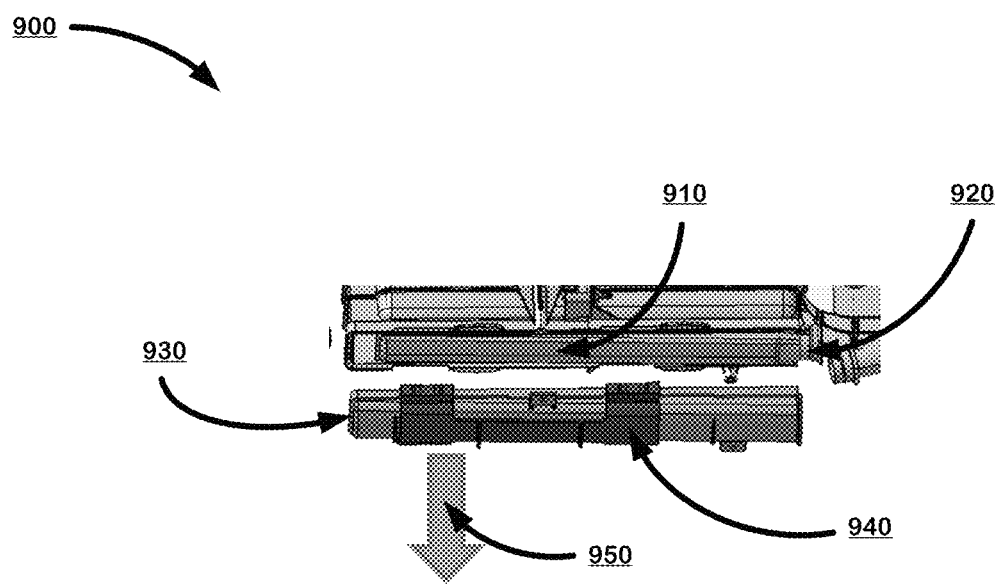
FIG. 9 shows an example of a heater core servicing configuration in accordance with one or more embodiments.

Turning to FIG. 9, FIG. 9 provides a close-up of an example of a heater core servicing configuration. The following example is for explanatory purposes and not intended to limit the scope of the disclosed technology. Turning to FIG. 9, a servicing area (900) may include taking the supporting cover (930) off the heater core (910) including at least one tank sleeve (920) as released by the locking element (940). The locking element (940) may remain disposed on a surface of the supporting cover (940) facing the direction of extraction (950). The locking element (940) may be removed from the HVAC assembly in the direction of extraction (950) along the Z-axis.

In one or more embodiments, after releasing of the locking element (940) from the heater core (910) and the supporting cover (930), and after disconnecting the at least one sealing attachment (740) of FIG. 7, the heater core (910) may be freely moved inward in a direction parallel to a direction of insertion, compressing the foam or elastic material, thereby creating space for the pipe tubes (720 in FIG. 7) to be disengaged from the heater core.

Figure 10:
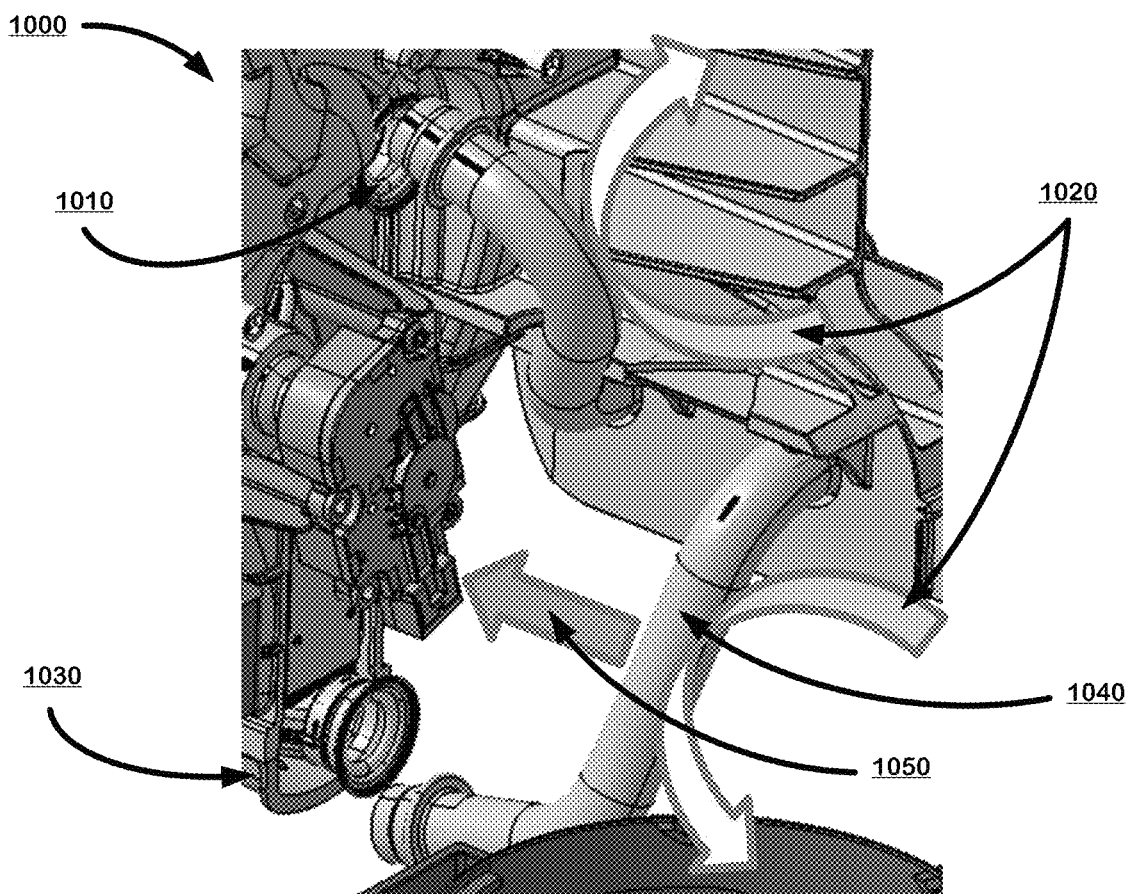
FIG. 10 shows an example of a heater core servicing configuration in accordance with one or more embodiments.

Turning to FIG. 10, FIG. 10 provides a close-up of an example of a heater core servicing configuration. The following example is for explanatory purposes and not intended to limit the scope of the disclosed technology. Turning to FIG. 10, the area (1000) may be the area (500) of FIG. 5 and may include the supporting cover (1030) detached from the heater core (910) of FIG. 9. The heater core may be pushed in a direction of insertion (1050) towards the HVAC assembly along the Y-axis. As such, the tubes (1040) may be rotated following a direction away from the direction of insertion (1020) to completely disconnect from the heater core. At this point, the heater core may be pushed against the elastic material disposed in the gap (690) of FIG. 6.

In one or more embodiments, disconnecting the tubes (1040) from the heater core and releasing the heater core from the supporting cover (1030) configures the heating core to move axially in every direction needed for removing the heating core from the HVAC assembly. That is, without the supporting cover (1030) holding the heater core in place, the heater core may move on a Y-axis parallel to the direction of insertion (1050) to disconnect from the tubes (1040). Subsequently, without the tubes (1040) holding the heater core static in a Z-axis, the heater core may now be removed in the direction of extraction along the Z-axis.

Figure 11:
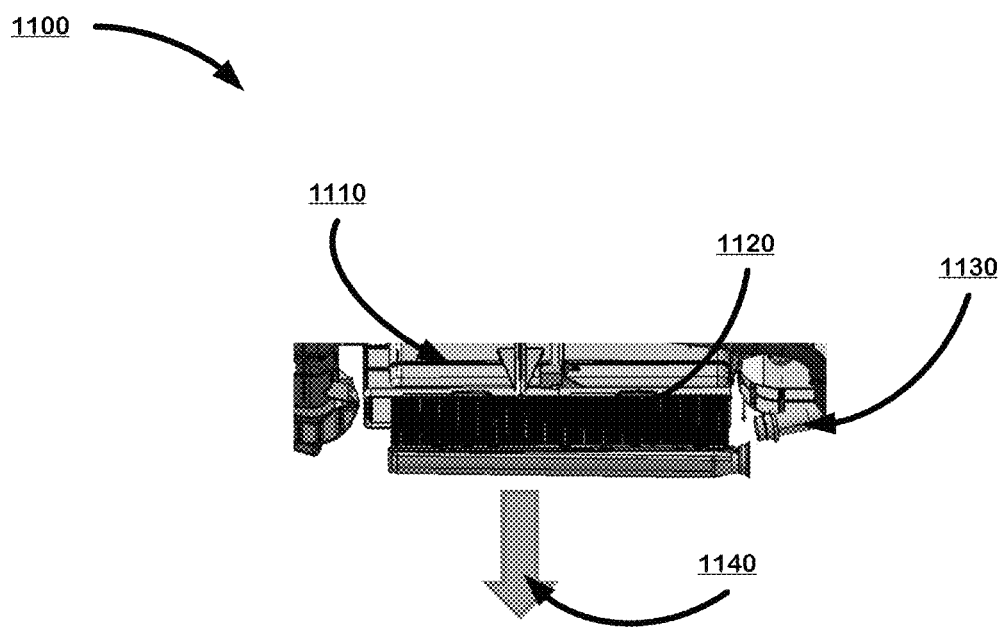
FIG. 11 shows an example of a heater core servicing configuration in accordance with one or more embodiments.

Turning to FIG. 11, FIG. 11 provides a close-up of an example of a heater core servicing configuration. The following example is for explanatory purposes and not intended to limit the scope of the disclosed technology. Turning to FIG. 11, a servicing area (1100) may include the heater core (1120) moving along a Z-axis in the direction of extraction (1140) and away from a previous heater core installation location, where the heater core was held in place by the supporting cover and at least one tube (1130). Furthermore, in one or more embodiments, the elastic material compressed to allow extraction of the heater core (1120) may come off from the HVAC assembly along with the heater core (1120) when servicing. Alternatively, the elastic material may remain intact when removing the heater core for servicing.

As described above, while FIGS. 3-11 describe a heater core that may be configured for servicing allowing the HVAC module to be assembled in a side to side configuration (horizontal) and still allowing the heater core to be serviced in a vertical manner avoiding a limited horizontal vehicle clearance, the heater core configured for serviceability is not limited to this arrangement. Similarly, its respective components are not limited to the order presented in the above figures.

Figure 12:
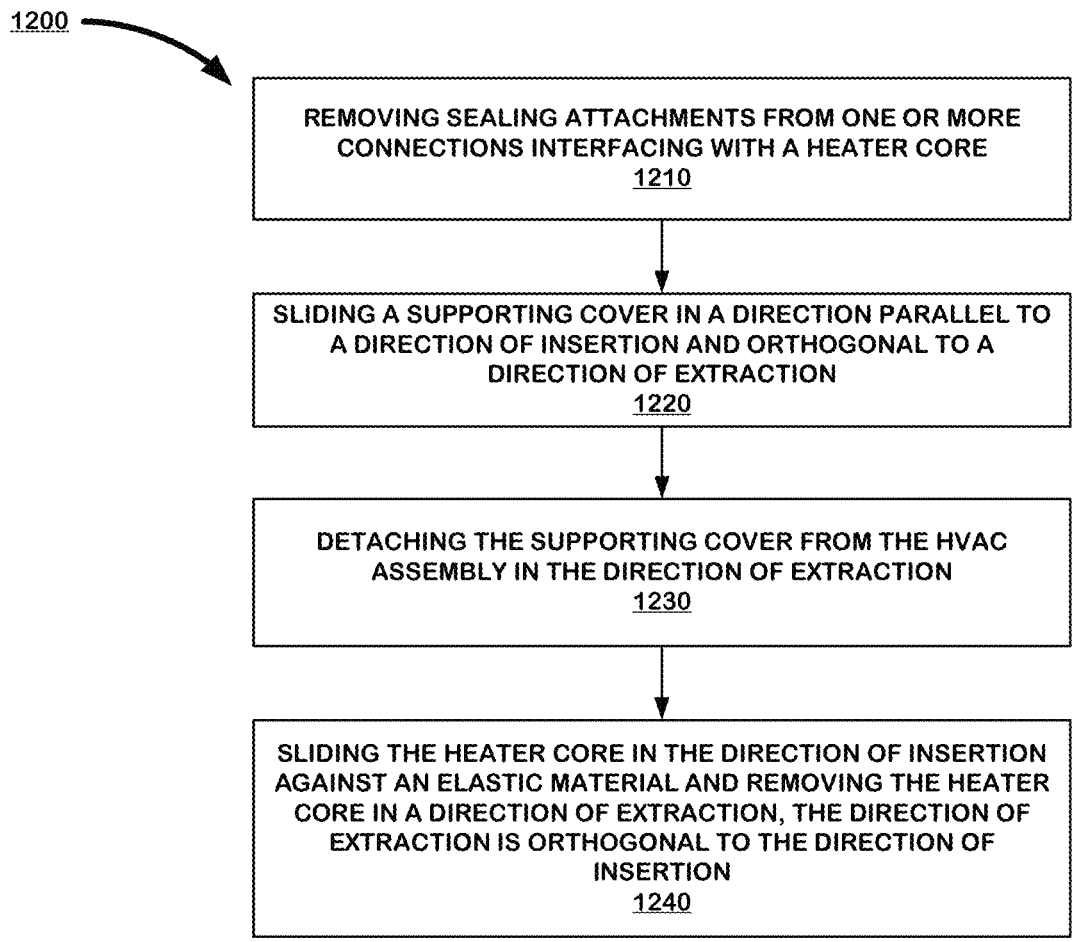
FIG. 12 shows a flowchart describing a process for servicing a heater core installed in an HVAC in accordance with one or more embodiments.

Turning to FIG. 12, FIG. 12 shows a flowchart in accordance with one or more embodiments. Specifically, FIG. 12 describes a method for servicing a heater core installed in an HVAC assembly for a motor vehicle. One or more blocks in FIG. 1 or 2 may be performed by one or more components as described above in FIGS. 3-11. While the various blocks in FIG. 12 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In step 1210, sealing attachments may be removed from one or more connections interfacing with a heater core. For example, the sealing attachments may be connected to a sealing point formed by the connection between a tube or pipe sleeve to the heater core. At this point, a sealing attachment may be needed to prevent leakage. As such, when servicing a heater core, the sealing attachments may be removed to ease mobility of other components in the HVAC assembly in the process of servicing the heater core. In one or more embodiments, the sealing attachments may be a spring-clamp which may be pulled on to release the sealing point and de-clamp the connection between the tube and the heater core.

In step 1220, a locking mechanism on the supporting cover may slide in a direction orthogonal to a direction of extraction of the heater core. For example, the supporting cover may include a locking element that attaches the supporting cover to the heater core and locks the heater core preventing any translational movement. As a result, the supporting cover may be removed by sliding the locking element translationally, parallel a direction of insertion.

In step 1230, the supporting cover may be detached in the direction of extraction of the heater core. As the serviceability process describes techniques for servicing a heater core in a direction orthogonal to a direction of insertion, the supporting cover may also be detached and removed from the HVAC assembly in the direction of extraction by first moving in the direction of insertion along a horizontal displacement.

In step 1240, the heater core slides inward, in the direction of insertion against an elastic compressible material. The space created by the sliding of the heater core in a horizontal direction allows for the interfacing connections interfacing with the heater core to be disconnected from the heater core in step 1250. This step may include, for example, the tubes of pipe sleeves being rotated to disconnect from the heater core once the heater core is allowed to slide horizontally. Horizontal sliding was previously restricted by the supporting cover. As such, the heater core may slide to the side and compress an elastic material arranged at the end of the sliding path and in the direction of insertion. The elastic material being a material that may be compressed without letting fluid/air bypass.

In one or more embodiments, the method described in FIG. 12 may be used for improving serviceability of a heater core installed in an HVAC system. Additionally, the aforementioned techniques for servicing a heater core may beneficial in reducing the number of parts required to be removed or dismantled when servicing a heater core of an HVAC assembly. For example, the method as described in FIG. 12 may reduce production and assembling costs because only one component of the HVAC assembly is removed in the servicing process. To this point, the heater core and its surroundings are also manufactured with the aforementioned configurations in mind. Thus, a manufacturing/assembling location may only improve in the servicing operations if the heater core has been manufactured/assembled with the above configurations for serviceability. This may be extra beneficial for heater cores assembled horizontally that may be serviced vertically.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A heating, ventilation, and air-conditioning (HVAC) assembly for a motor vehicle, the HVAC assembly comprising:
    a heater core;
    a supporting cover configured to detach from the HVAC assembly in a direction of extraction;
    a locking element configured to lock the supporting cover by sliding in a direction orthogonal to the direction of extraction; and
    a casing with walls defining an internal volume of the HVAC,
    wherein the heater core interfaces with an interfacing connection, the interfacing connection being connected to a sealing attachment,
    wherein the heater core is configured to slide inward in the internal volume toward an opposite side of the casing, in the direction of insertion,
    wherein the HVAC assembly is configured for removing the heater core by removing the heater core from the casing in the direction of extraction, and
    wherein the direction of extraction of the heater core is orthogonal to the direction of insertion.

2. The HVAC assembly of claim 1,
    wherein the supporting cover comprises the locking element attached to an outer surface of the supporting cover,
    wherein the outer surface is a surface of the supporting cover that faces the direction of extraction,
    wherein, when the supporting cover is locked, the supporting cover is in contact with the heater core; and
    wherein, when the supporting cover is locked, the locking element is not in contact with the heater core.

3. The HVAC assembly of claim 1,
    wherein the interfacing connection is a pipe sleeve that transports fluids to, or from, the heater core,
    wherein the sealing attachment is a spring-clamp sealing attachment clamped onto the pipe sleeve, and
    wherein a sealing point of the HVAC assembly is located on the interfacing connection.

4. The HVAC assembly of claim 3, the assembly further comprising:
    a tab of the spring-clamp sealing attachment that locks the pipe sleeve; and
    a clamp of the spring-clamp sealing attachment that clamps around the pipe sleeve.

5. The HVAC assembly of claim 1,
    wherein the interfacing connection is configured for disconnecting from the heater core by sliding the heater core away from the interfacing connection; and
    wherein the interfacing connection is configured for rotating in a direction away from the heater core.

6. The HVAC assembly of claim 1,
    wherein the sealing attachment is attached to the interfacing connection, and
    wherein the HVAC assembly of the motor vehicle further comprises at least two another sealing attachments attachment attached to at least two another interfacing connection connections, each sealing element corresponding to a respective interfacing connection.

7. The HVAC assembly of claim 6,
    wherein the direction of extraction is a direction facing a service point, the service point being a point for extracting that allows the heater core to be serviced extracted.

8. A heating, ventilation, and air-conditioning (HVAC) system for a motor vehicle, the system comprising:
    an HVAC assembly comprising:
        a heater core;
        a supporting cover configured to detach from the HVAC assembly in a direction of extraction;
        a locking element configured to lock the supporting cover by sliding in a direction orthogonal to the direction of extraction; and
        a casing with walls defining an internal volume of the HVAC assembly;
    at least two pipe sleeves interfacing an interfacing connection that interfaces with the heater core, the at least two pipe sleeves interfacing connection transporting fluids to, or from, the heater core; and
    at least two a sealing attachment that seal at least two seals a sealing points point of the HVAC system,
    wherein the interfacing connection is connected to the sealing attachment,
    wherein the heater core is configured to slide inward in the internal volume toward an opposite side of the casing, in the direction of insertion, thereby compressing an elastic material,
    wherein the HVAC system is configured for removing the heater core by removing the heater core from the casing in the direction of extraction, and
    wherein the direction of extraction of the heater core is orthogonal to the direction of insertion.

* * * * *